(12) United States Patent
Yajima et al.

(10) Patent No.: US 8,931,511 B2
(45) Date of Patent: Jan. 13, 2015

(54) VALVE DEVICE AND FAILURE DETECTOR OF HYDRAULIC CIRCUIT

(71) Applicant: Honda Motor Co., Ltd, Tokyo (JP)

(72) Inventors: Naoki Yajima, Wako (JP); Tatsuhiro Tomari, Wako (JP); Minoru Ueno, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 163 days.

(21) Appl. No.: 13/785,390

(22) Filed: Mar. 5, 2013

(65) Prior Publication Data
US 2013/0233415 A1  Sep. 12, 2013

(30) Foreign Application Priority Data

Mar. 7, 2012  (JP) .................................. 2012-051055

(51) Int. Cl.
| | |
|---|---|
| *F16K 31/02* | (2006.01) |
| *F16H 61/02* | (2006.01) |
| *F16H 61/12* | (2010.01) |
| *F16K 11/18* | (2006.01) |
| *F16K 37/00* | (2006.01) |

(52) U.S. Cl.
CPC ............ *F16K 31/02* (2013.01); *F16H 61/0251* (2013.01); *F16H 61/12* (2013.01); *F16K 11/18* (2013.01); *F16K 37/0083* (2013.01); *F16H 2061/0253* (2013.01)
USPC ................... 137/595; 137/596.17; 137/596.1; 137/601.01; 251/129.06; 73/168

(58) Field of Classification Search
USPC ............ 137/595, 596, 596.1, 596.17, 601.01, 137/627.5, 637, 637.1; 251/129.06; 73/168
See application file for complete search history.

(56) References Cited

U.S. PATENT DOCUMENTS

| | | | | |
|---|---|---|---|---|
| 2,354,960 | A | * | 8/1944 | Morehouse ............... 137/601.01 |
| 2,708,561 | A | * | 5/1955 | Ehlke ........................ 137/601.01 |
| 3,002,498 | A | * | 10/1961 | Quayle ..................... 137/596.17 |
| 3,378,031 | A | * | 4/1968 | Hatashita ................. 137/596.17 |
| 4,086,889 | A | * | 5/1978 | Yagi et al. ................ 137/596.17 |
| 5,035,262 | A | * | 7/1991 | Schweikert .................... 137/637 |
| 6,539,970 | B1 | * | 4/2003 | Knowles et al. .............. 137/637 |

(Continued)

FOREIGN PATENT DOCUMENTS

| | | | |
|---|---|---|---|
| FR | 2710954 | A1 * | 4/1995 |
| JP | 2000046015 | A * | 2/2000 |
| JP | 2003-74729 | A | 3/2003 |

*Primary Examiner* — John Rivell
(74) *Attorney, Agent, or Firm* — Westerman, Hattori, Daniels & Adrian, LLP

(57) ABSTRACT

A valve device is provided with a contraction-type high polymer gel actuator which laminates slab-like negative plates and mesh-like positive plates alternately and interleaves high polymer gel between each negative plate and each positive plate, and with a first and a second valve mechanisms driven by the gel actuator. The direction of deformation of expansion and contraction of the high polymer gel actuator is the same as the driving direction of the first valve mechanism and perpendicular to the driving direction of the second valve mechanism. The valve device is composed in such a way as to switch opening and closing of a first fluid passage and a second fluid passage simultaneously by means of deformation of expansion and contraction by controlling voltage applied to the high polymer gel actuator. This allows to compose a valve device that can open and close plural oil passages at an identical timing.

9 Claims, 10 Drawing Sheets

(56) References Cited

U.S. PATENT DOCUMENTS

| | | | |
|---|---|---|---|
| 6,685,442 B2 * | 2/2004 | Chinn et al. | 251/129.06 |
| 7,055,796 B2 * | 6/2006 | Voss | 251/129.06 |
| 7,849,986 B2 * | 12/2010 | Kitou et al. | 192/3.58 |
| 8,733,731 B2 * | 5/2014 | Ueno et al. | 251/129.06 |
| 2011/0016705 A1 * | 1/2011 | Randazzo et al. | 29/605 |
| 2012/0169184 A1 * | 7/2012 | Pelrine et al. | 310/365 |

* cited by examiner

Case 1

Case 2

A-A

Enlarged B part

VALVE DEVICE AND FAILURE DETECTOR OF HYDRAULIC CIRCUIT

CROSS-REFERENCE TO RELATED APPLICATION

The present disclosure relates to subject matter contained in Japanese Patent Application No. 2012-051055, filed on Mar. 7, 2012, the disclosure of which is expressly incorporated herein by reference in its entirety.

BACKGROUND OF THE INVENTION

1. Technical Field

This invention relates to a valve device which is suitable for use in hydraulic control of a hydraulic apparatus such as an automatic transmission installed in a vehicle, and a failure detector for a hydraulic circuit comprising the valve device.

2. Description of the Related Art

Conventionally, as a valve device for switching flow passages of hydraulic fluid for gearshift control in an automatic transmission installed in a vehicle, a valve device comprising an actuator consisting of a solenoid is used. As shown, for example, in Japanese Patent Application Publication No. 2003-74729 (Patent Document 1), this type of valve device comprises a valve plug for opening and closing an oil passage and a solenoid for driving the valve plug intervened by a plunger, having a structure which drives the valve plug by turning on/off electromagnetic force of the solenoid to switch opening and closing of the oil passage. Specifically, in this type of valve device, the oil passage is closed when power is off because a spring-biased plunger pushes the valve plug to a valve seat surface. In contrast, the plunger retracts against the biased force of the spring by electromagnetic force of the solenoid when power is on. This causes the valve plug to separate from the seat surface by the force of hydraulic pressure of the hydraulic fluid and open the oil passage.

SUMMARY OF THE INVENTION

There has been a problem with the valve device comprising the actuator consisting of the solenoid that the valve device has a complicated structure with a large number of components and large external dimensions and weight due to various built-in materials such as metal solenoid and magnet. Also, there is a problem that component costs increase. In an automatic transmission for a vehicle, in particular, plural pieces (normally around 4-6 pieces) of the valve devices having the said structure are used for one automatic transmission for the vehicle, and hence the problem of large weight and component costs becomes all the more serious. Furthermore, there is a problem with the valve device having the said structure that operating noise when opening and closing the oil passage grows due to driving noise of the solenoid.

In addition, hydraulic control using a hydraulic circuit comprising the valve device has the following problem. Specifically, when the valve device is installed in each of the plural oil passages, simultaneous switching of opening and closing of the plural oil passages is enabled by simultaneously switching voltage application to each valve device installed in each oil passage, which allows each valve device to drive at an identical timing. However, the actuator structure provided by each valve device does not have completely identical physical dimensions and configuration with each other. Each valve device has minor difference. Thus, there is a problem that a certain time-lag occurs because the timing of opening and closing of each oil passage by means of each valve device is not completely the same even if switching voltage application to each valve device simultaneously. This might interfere with improving accuracy of hydraulic pressure control using the oil hydraulic circuit.

Moreover, when a failure such as circulating malfunction of hydraulic fluid occurs to the hydraulic circuit comprising the valve device, it is needed to quickly identify its cause and take an appropriate fail safe action. However, failures of the hydraulic circuit provided with the valve device include circulating failures of the hydraulic fluid caused by metal abrasion powder (i.e., contamination) contained in the hydraulic fluid inside the hydraulic circuit (i.e., the oil passage) and electrical failures such as malfunction or energization failures of a solenoidal coil of the valve device. Therefore, a determination should be made according to these kinds of failures when a failure occurs to the hydraulic circuit. In addition, when the hydraulic circuit includes plural oil passages for controlling opening and closing with plural valve devices, it is needed to identify in which valve device or oil passage the failure has occurred. Therefore, a conventional control device for determining a failure of the hydraulic circuit has complicated control specifications which require time to determine the kind of the failure.

In view of the problems, the present invention has an object to provide a valve device which has a distinctly simple structure and is capable of major reduction in size, weight and cost compared to a conventional valve device including solenoid. Another object of the present invention is to provide a valve device which can improve accuracy of hydraulic control by allowing for performing opening and closing of plural oil passages at an identical timing. A still further object of the present invention is to provide a failure detector which can swiftly determine the kind of failure in a hydraulic circuit including plural valve mechanisms that perform opening and closing of plural oil passages.

In order to solve the problems described above, a valve device according to the present invention comprises: a contraction-type high polymer gel actuator (10) that laminates one or plural slab-like negative plates (11) and one or plural mesh-like positive plates (13) alternately and puts high polymer gel (15) between each negative plate (11) and each positive plate (13); a first valve mechanism (20-1) consisting of a first fluid passage (21-1) in which fluid flows, a first valve plug (31-1) that opens and closes the first fluid passage (21-1), and a first actuating member (33-1) that transmits driving force associated with deformation of expansion and contraction of the high polymer gel actuator (10) between the high polymer gel actuator (10) and the first valve plug (31-1); and a second valve mechanism (20-2) consisting of a second fluid passage (21-2) in which fluid flows, a second valve plug (31-2) that opens and closes the second fluid passage (21-2), and a second actuating member (33-2) that transmits driving force associated with deformation of expansion and contraction of the high polymer gel actuator (10) between the high polymer gel actuator (10) and the second valve plug (31-2); wherein the direction of movement of the negative plate (11) and the positive plate (13) associated with deformation of expansion and contraction of the high polymer gel actuator (10) is the same as the direction of movement of the driving direction of the first actuating member (33-1) and the first valve plug (31-1) of the first valve mechanism (20-1), and is perpendicular to the driving direction of the second actuating member (33-2) and the second valve plug (31-2) of the second valve mechanism (20-2); and opening and closing of the first fluid passage (21-1) and the second fluid passage (21-2) is configured to switch simultaneously by driving simultaneously the first valve plug (31-1) intervened by the first actuating member (33-1) and the second valve plug (31-2) intervened by the second actuating member (33-2) by means of deformation of expansion and contraction by controlling voltage applied to the high polymer gel actuator (10). As the high polymer gel, PVC gel that is polyvinyl chloride (PVC) with plasticizers added thereto can be used.

The valve device according to the present invention comprises the high polymer gel actuator comprising high polymer gel inserted between the negative plates and the positive plates as an actuator for driving the valve plug. The high polymer gel actuator allows for the valve device to be distinctly simplified in structure and largely reduced in size, weight and cost compared to a conventional valve device provided with an actuator consisting of solenoid. Since plural valve devices for hydraulic control are used especially for an automatic transmission installed in a vehicle, the use of the valve devices having the said structure according to the present invention as the plural valve devices can largely contribute to reduction in size, weight and cost of the automatic transmission and the vehicle. Also, the valve device according to the present invention can ensure tranquility during operation because driving the valve plug by means of deformation of expansion and contraction of the high polymer gel actuator makes no or very low operating noise when opening and closing the fluid passage.

The valve device according to the present invention is configured to switch opening and closing of the first fluid passage and the second fluid passage simultaneously by simultaneously driving the first valve plug intervened by the first actuating member and the second valve plug intervened by the second actuating member by means of deformation of expansion and contraction by controlling voltage applied to the high polymer gel actuator. Thus, since opening and closing of the first fluid passage and the second fluid passage can be performed at an identical timing, accuracy of hydraulic control in a hydraulic circuit that switches opening and closing of plural oil passages can be improved.

Further, the first actuating member (33-1) of the first valve mechanism (20-1) of the valve device is configured to be loaded from the negative plates (11) or the positive plates (13) of the high polymer gel actuator (10) into the laminating direction so as to move to the same direction. On the other hand, a power transmission section (41) for converting forward and backward movement of the negative plates (11) or the positive plates (13) into forward and backward movement of the second actuating member (33-2) to be transmitted is provided between the second actuating member (33-2) of the second valve mechanism (20-2) and the negative plates (11) or the positive plates (13) of the high polymer gel actuator (10). Thus, the second actuating member (33-2) is configured to move to the second valve plug (31-2) side via the power transmission section (41) when moving to the direction that the negative plates (11) and the positive plates (13) move closer to each other by applying voltage to the high polymer gel actuator (10). The first valve mechanism (20-1) may be a normally-closed type valve mechanism in which the first valve plug (31-1) closes the first fluid passage (21-1) when not applying voltage to the high polymer gel actuator (10). The second valve mechanism (20-2) may be a normally-open type valve mechanism in which the second valve plug (31-2) opens the second fluid passage (21-2) when not applying voltage to the high polymer gel actuator (10). This configuration can realize the valve device that can simultaneously drive the two valve mechanisms by the single high polymer gel actuator having a simple structure reduced in the number of components.

Further, the valve device is provided with the power transmission section, as a configuration for applying pressing force to the second valve plug by using the contraction-type high polymer gel actuator, that converts forward and backward movement of the negative plates and the positive plates into forward and backward movement of the second actuating member to be transmitted. The valve device is configured so that the second actuating member moves to the second valve plug side via the power transmission section when moving to the direction that the negative plates and the positive plates move closer to each other by applying voltage to the high polymer gel actuator. This enables to realize the normally-open type valve mechanism, having a simple and inexpensive structure excellent in tranquility during operation, in which the second valve plug closes the second fluid passage when applying voltage to the high polymer gel actuator. Furthermore, the second valve plug is configured to be driven by converting movement of the negative plates and the positive plates into movement of the second actuating member so that an appropriate load can be applied to the second valve plug to close the fluid passage without utilizing flowing force of fluid. Therefore, the valve device also excellent in controlling the opening and closing operation of the fluid passage can be configured.

In this case, when moving to the direction that the negative plates (11) and the positive plates (13) move closer to each other by applying voltage to the high polymer gel actuator, the second actuating member (33-2) moves to the second valve plug (31-2) side by pressing second inclined planes (36a, 36a) with first inclined planes (11a, 11a).

This configuration allows for converting movement of the negative plates and the positive plates into movement of the second actuating member so as to drive the second valve plug, with a simple structure reduced in the number of components and without requiring novel components for the power transmission section. Also, failures such as malfunction are less likely to occur to the valve device due to a simple structure in which the inclined planes contact each other. Therefore, the valve device has high reliability and durability.

In addition, the valve device should be provided with a biasing member (16) for biasing toward the direction that the second actuating member (33-2) separates from the second valve plug (31-2). Providing such biasing member can cause the second actuating member to follow the negative plates and the positive plates that return to their initial positions when stopping application of voltage to the high polymer gel actuator. Therefore, the second actuating member and the second valve plug can be securely returned to their initial positions.

Or, instead of the biasing member (16), guide mechanisms (17,17) may be installed between the negative plates (11) or the positive plates (13) and the second actuating member (33-2) so as to move the second actuating member (33-2) forward and backward while maintaining contact between the first inclined planes (11a, 11a) and the second inclined planes (36a, 36a). Preferably, the guide mechanisms (17, 17) are configured to engage projections (11b, 11b) installed on the negative plate (11) side or the positive plate (13) side and other projections (36b, 36b) installed on the second actuating member (33-2) side in such a way as to be relatively-movable only to the sliding direction of the first inclined planes (11a, 11a) and the second inclined planes (36a, 36a).

Providing such the guide mechanisms can also cause the second actuating member to follow the negative plates and the positive plates that return to their original positions when stopping voltage application to the high polymer gel actuator, which enables the second actuating member to securely return to its original position. Also, the guide mechanisms can cause the negative and positive plates and the second actuating member to relatively move while maintaining contact between each other, which enables the second actuating member to securely move forward and backward. Further, since providing the guide mechanisms requires no biasing member, the valve device can be simplified in structure with the reduced number of components.

In addition, a failure detector of a hydraulic circuit according to the present invention comprises: a first pressure detection section (122-1) for detecting pressure of hydraulic fluid of a first hydraulic circuit (120-1); a second pressure detection section (122-2) for detecting pressure of hydraulic fluid of a second hydraulic circuit (120-2); and a failure detection section (150) for detecting failures of driving sources including the high polymer gel actuator (10) of the valve device (1) and failures of the first and second hydraulic circuits (120-1, 120-2) on a basis of pressure detected by the first and second pressure detection sections (122-1, 122-2); in a hydraulic circuit (100) comprising the first hydraulic circuit (120-1) for switching opening and closing an oil passage (102-1) by the first valve mechanism (20-1) of the valve device (1) and the second hydraulic circuit (122-2) for switching opening and closing of an oil passage (102-2) by the second valve mechanism (20-2); wherein the failure detection section (150) determines that the driving sources of the valve device (1) are normal and either of the first or second hydraulic circuit (120-1, 120-2) has a failure in the case where only one of either a value based upon pressure (PxA) detected by the first pressure detection section (122-1) or a value based upon pressure (PxB) detected by the second pressure detection section (122-2) falls out of a normal range.

The failure detector of the hydraulic circuit according to this invention determines that the driving sources of the valve device are normal and either of the first or second hydraulic circuit has a failure in the case where only one of either a value based upon pressure detected by the first pressure detection section or a value based upon pressure detected by the second pressure detection section falls out of a normal range. Thus, when a failure occurs to the hydraulic circuit, it can be determined whether its cause is a failure of the driving sources of the valve device or a failure of the first and second hydraulic circuits and which of the first or second hydraulic circuit has the failure when the failure has occurred to either of the first or second hydraulic circuit (120-1, 120-2). Therefore, since the cause of the failure can be identified quickly and precisely, an appropriate fail safe action can be taken. Further, the failure detector can identify the cause of the failure in the hydraulic circuit by using the values based upon pressure detected by the first and second pressure detection sections, which can streamline control specifications of the failure detector and contribute to reduction in cost of the device.

Also, in the failure detector, the failure detection section (150) may determine that values based upon pressure detected by the first or second pressure detection section (122-1, 122-2) have fallen out of a normal range in the case where differences (PxA, PxB) between the detected values of pressure detected by the first and second pressure detection sections (122-1, 122-2) and a predetermined pressure command exceed a predetermined range and their durations (TxA, TxB) last longer than a predetermined duration (Tx0). This enables to perform failure determination of the driving sources of the valve device or the first and second hydraulic circuits more accurately so as to prevent misjudgment of failures in the hydraulic circuit. It is noted that the above characters in parentheses represent, by way of example, reference characters of components of embodiments to be described herein later.

The valve device according to the present invention has a distinctly simple structure and is capable of major reduction in size, weight and cost compared to a conventional valve device. The valve device can improve accuracy of hydraulic control by allowing to perform opening and closing of plural oil passages at an identical timing.

The failure detector according to the present invention can swiftly determine the kind of failure in the hydraulic circuit including the plural valve mechanisms that switch opening and closing of the plural oil passages.

BRIEF DESCRIPTION OF THE DRAWINGS

FIG. 2A is a diagram illustrating a state that an oil passage is opened when not applying voltage.

FIG. 2B is a diagram illustrating a state that an oil passage is closed when applying voltage.

DETAILED DESCRIPTION OF THE INVENTION

Hereinafter, embodiments of the present invention will be described in detail with reference to the appending drawings.

First Embodiment

Figure 1:
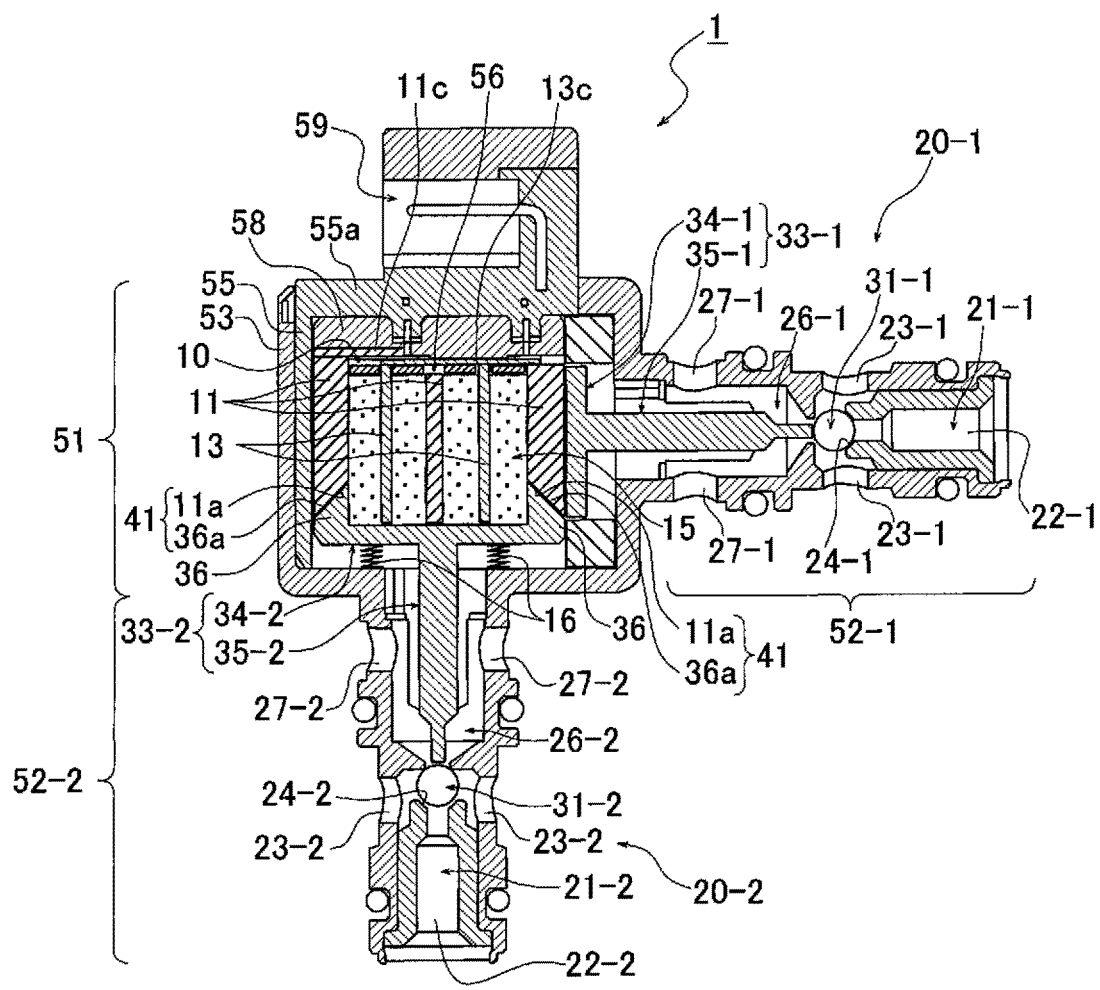
FIG. 1 is a sectional side view showing a valve device according to a first embodiment of the present invention.

FIG. 1 is a sectional side view showing a valve device 1 according to a first embodiment of the present invention. The valve device 1 shown in the figure is a valve device which is suitable for use in controlling flow of hydraulic fluid for gearshift control in an automatic transmission installed in a vehicle. This valve device 1 comprises a set of a first valve mechanism 20-1 and a second valve mechanism 20-2 and a single contraction-type PCV gel actuator (i.e., a high polymer gel actuator) 10 that drives ball valves (i.e., valve plugs) 31-1, 31-2 of the set of the valve mechanisms 20-1, 20-2. The valve device 1 is configured to simultaneously drive the set of the valve mechanisms 20-1, 20-2 by operation of the contraction-type PVC gel actuator 10 so as to simultaneously open and close two different oil passages 21-1, 21-2.

The valve device 1 includes a roughly cubical body part (i.e., a valve body) 51 housing the PVC gel actuator 10, a first roughly cylindrical shank 52-1 projected from one side of the body part 51 that has a smaller cross-section than the body part 51 and a second roughly cylindrical shank 52-2 projected from another side adjacent to the one side of the body part 51 that has a smaller cross-section than the body part 51. The first and second shanks 52-1, 52-2, roughly similar-shaped, extend from the body part 51 in such directions as their axial directions are perpendicular to each other. The first shank 52-1 is provided with the first valve mechanism 20-1 for opening and closing the first oil passage 21-1, and the second shank 52-2 is provided with the second valve mechanism 20-2 for opening and closing the second oil passage 21-2. The first and second valve mechanisms 20-1, 20-2 are common to each other in most of their structures, except for bases 34-1, 34-2 of a first and a second plungers 33-1, 33-2 that will be referred to later. Therefore, hereinafter, configurations of components common to the first and second valve mechanisms 20-1, 20-2 will be described collectively.

The body part 51 of the valve device 1 has a dual structure that consists of an outer case 53 and an inner case 55. In the inner case 55, a house 56 for housing the PVC gel actuator 10 is formed. A terminal 59, to which an external terminal (not shown in the figure) for feeding the PVC gel actuator 10 is connected, is mounted on the upper end of the inner case 55.

The contraction-type PVC gel actuator 10 is a high polymer gel actuator provided with PVC gel (i.e., high polymer gel) which is polyvinyl chloride (PVC) with plasticizers added thereto, and configured to laminate plural negative plates 11 and plural positive plates 13 alternately and puts PVC gel 15 between each negative plate 11 and each positive plate 13. A wiring part 11c integrally connects one negative plate 11 to another negative plate 11, and a wiring part 13c integrally connects one positive plate 13 to another positive plate 13. The wiring part 11c conducts the negative plates 11 to the terminal 59, and the wiring part 13c conducts the positive plates 13 to the terminal 59. Both the negative plates 11c and the positive plates 13 have a roughly quadrilateral external shape along the internal shape of the inner case 55. While the negative plate 11 is formed in a slab-like shape, the positive plate 13 is formed in a fine mesh-like (i.e., net-like) form in a way that the entire surface of the positive plate 13 crisscrosses, the details of which are not shown in the figure. Such configuration ensures that the PVC gel 15 slides into mesh-like spaces of the positive plate 13 when applying voltage so that the PVC gel actuator 10 contracts along the laminating direction. The basic configuration of the contraction-type PVC gel actuator 10 and its operation are disclosed in publication such as Misaki Yamano, Naoki Ogawa, Minoru Hashimoto, Midori Takasaki and Toshihiro Hirai "Structure and Characteristics of Contraction Type PVC Gel Actuator", *Advanced Robotics*, Vol. 27, No. 7, pp. 718-724, 2009.

The laminating direction (i.e., the direction of deformation of expansion and contraction of the negative plates 11 and the positive plates 13 of the PVC gel actuator 10 is the same as the axial direction of the first valve mechanism 20-1 (i.e., the forward and backward movement direction of the plunger 33-1 and the driving direction of the ball valve 31-1), and perpendicular to the axial direction of the second valve mechanism 20-2 (i.e., the forward and backward movement direction of the second plunger 33-2 and the driving direction of the ball valve 31-2). The number of laminations of the negative plates 11 and the positive plates 13 in the PVC 10 gel actuator should be determined considering the amount of displacement (i.e., the amount of movement) of the ball valves 31-1, 31-2 that are required for opening and closing the oil passages 21-1, 21-2 of the first and second valve mechanisms 20-1, 20-2.

The first and second valve mechanisms 20-1, 20-2 comprise: the oil passages (i.e., the fluid passages) 21-1, 21-2, in which hydraulic fluid flows, installed in the first and second shanks 52-1, 52-2; the ball valves (i.e., valve plugs) 31-1, 31-2 for opening and closing the oil passages 21-1, 21-2; and the first and second plungers (i.e., the actuating members) 33-1, 33-2 for transmitting driving force of the PVC gel actuator 10 to the ball valves 31-1, 31-2.

The body part 51 and the first and second shanks 52-1, 52-2 compose a whole of the outer case 53, and the inner case 55 for housing the PVC gel actuator 10 is fit in the inner periphery of the outer case 53 in the body part 51. The oil passages 21-1, 21-2 are formed inside the first and second shanks 52-1, 52-2. The oil passages 21-1, 21-2 comprise inlet ports 22-1, 22-2 extending from the leading ends of the first and second shanks 52-1, 52-2 to the body part 51 side in the axial direction, and outlet ports 23-1, 23-2 extending from the downstream ends of the inlet ports 22-1, 22-2 to outward radially. The downstream ends of the inlet ports 22-1, 22-2 house the spherical ball valves 31-1, 31-2 and are provided with valve seats 24-1, 24-2 for seating the ball valves 31-1, 31-2. The ball valves 31-1, 31-2 are configured to abut on and separate from the valve seats 24-1, 24-2 by moving in the oil passages 21-1, 21-2. This allows for switching opening and closing of the oil passages 21-1, 21-2.

The first plunger 33-1 of the first valve mechanism 20-1 intervenes between the PVC gel actuator 10 and the ball valve 31-1. This first plunger 33-1 comprises the slab-like base 34-1 abutting on one end of the contraction direction of the PVC gel actuator 10 and a rod-shaped needle part 35-1 projected from the base 34-1 toward the ball valve 31-1 side. The leading end of the needle part 35-1 is configured to abut on and then press the ball valve 31-1. The base 34-1 of the first plunger 33-1 is fixed in surface-contact with the exterior of the negative plate 11 so as to move forward and backward integrally with the negative plate 11 in association with deformation of expansion and contraction of the PVC gel actuator 10 along the direction of such the deformation of expansion and contraction. The PVC gel actuator 10 is set in the housing 56 in a state that the laminating direction is slightly pre-compressed, and assembled in a state that a predetermined preset load is applied to the first plunger 33-1 and the ball valve 31-1.

The leading end of the needle part 35-1 of the first plunger 33-1 is configured to abut on and then press the ball valve 31-1. A drain chamber 26-1 is installed in the place where the needle part 35-1 in the first shank 52-1 is housed so as to flow surplus hydraulic fluid from the oil passage 21-1 therein. Drain ports 27-1, 27-1 are open from the drain chamber 26-1 to both the radially outward directions of the first shank 52-1.

The second plunger 33-2 of the second valve mechanism 20-2 intervenes between the PVC gel actuator 10 and the ball valve 31-2. The second plunger 33-2 comprises the base 34-2 which abuts on one end perpendicular to the contraction direction in the PVC gel actuator 10, and a rod-shaped needle part 35-2 projected from the base 34-2 toward the ball valve 31-2 side. The base 34-2 is slab-like and expands from the root of the plunger 33-2 toward the direction perpendicular to the axial direction of the plunger 33-2. At each of both ends of the base 34-2, a protruding part 36 projected to the PVC gel actuator 10 side (i.e., the upper side) is installed. The inside of the protruding parts 36, 36 is filled with part of the PVC gel 15. The leading ends (i.e., the upper ends) of the protruding parts 36, 36 are inclined planes (i.e., second inclined planes) 36a, 36a that are sloped toward the forward and backward movement direction (i.e., the up-and-down direction) of the second plunger 33-2. The inclined planes 36a, 36a on the both sides are symmetrical to each other and sloped toward the gradually-rising direction from the outside diameter side to the center side of the second plunger 33-2. In the present embodiment, the inclined planes 36a, 36a are sloped toward both of the forward and backward movement direction of the second plunger 33-2 and the forward and backward movement direction of the negative plates 11 and the positive plates 13 at forty-five degrees.

In contrast, inclined planes (i.e., first inclined planes) 11*a*, 11*a* that are sloped toward the forward and backward movement direction (i.e., the traverse direction) of the negative plates 11, 11 are installed at the ends of the downsides (i.e., the second plunger 33-2 sides) of both the outer negative plates 11, 11 provided by the PVC gel actuator 10. The inclined planes 11*a*, 11*a* are sloped toward the gradually-rising direction from the outside diameter side toward the center side of the second plunger 33-2. The inclined planes 11*a*, 11*a* on the both sides are symmetrical to each other and are sloped toward both of the forward and backward movement direction of the negative plates 11 and the positive plates 13 and the forward and backward movement direction of the second plunger 33-2 at forty-five degrees.

Coil springs (i.e., biasing means) 16, 16 intervene between the exterior (i.e., the underside) of the base 34-2 of the second plunger 33-2 and the interior of the outer case 53 opposed to the exterior. The coil springs 16, 16 are installed respectively on the both sides of the needle part 35-2. The axial direction is arranged in the up- and -down direction, which allows the second plunger 33-2 to be biased toward the PVC gel actuator 10 side (i.e., the upperside).

The second plunger 33-2 is biased toward the PVC gel actuator 10 side via the biased force of the coil spring 16 so that the inclined planes 36*a*, 36*a* of the protruding parts 36, 36 of the second plunger 33-2 abut on the inclined planes 11*a*, 11*a* of the negative plates 11, 11 in surface contact. Therefore, when the negative plates 11, 11 on the both sides move closer to each other by applying voltage to the PVC gel actuator 10, pressing force acts from the inclined planes 11*a*, 11*a* of the negative plates 11, 11 on the inclined planes 36*a*, 36*a* of the second plunger 33-2 so that the second plunger 33-2 moves to the ball valve 31-2 side (i.e., the downside) via the pressing force.

The inclined planes 11*a*, 11*a* of the negative plates 11, 11 and the inclined planes 36*a*, 36*a* of the second plunger 33-2 configure a power transmission section 41 which converts forward and backward movement of the negative plates 11, 11 into forward and backward movement of the second plunger 33-2 to be transmitted. This configures an actuator mechanism that can provide pressing force to the second valve mechanism 20-2 when applying voltage to the contraction-type PVC gel actuator 10.

Figure 2A:
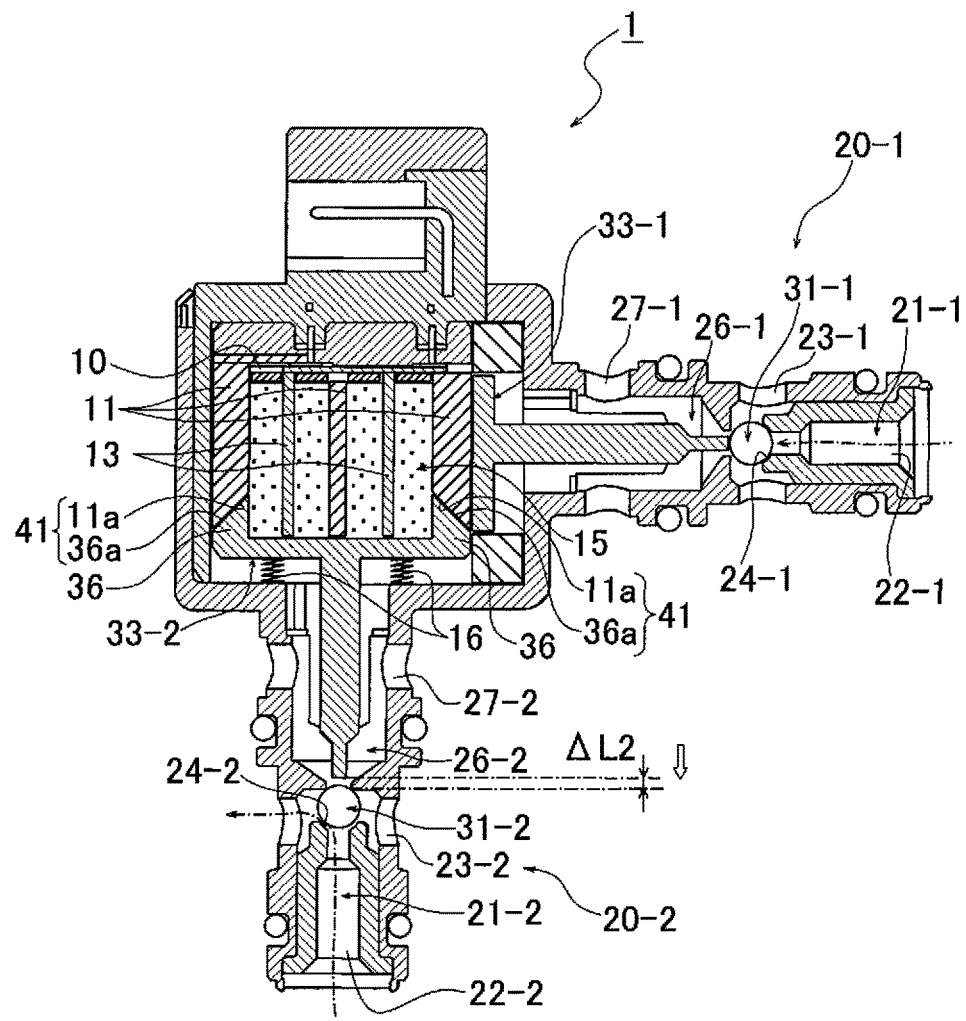
FIG. 2A and FIG. 2B show diagrams illustrating operations of a PVC gel actuator and a valve device.
Figure 2B:
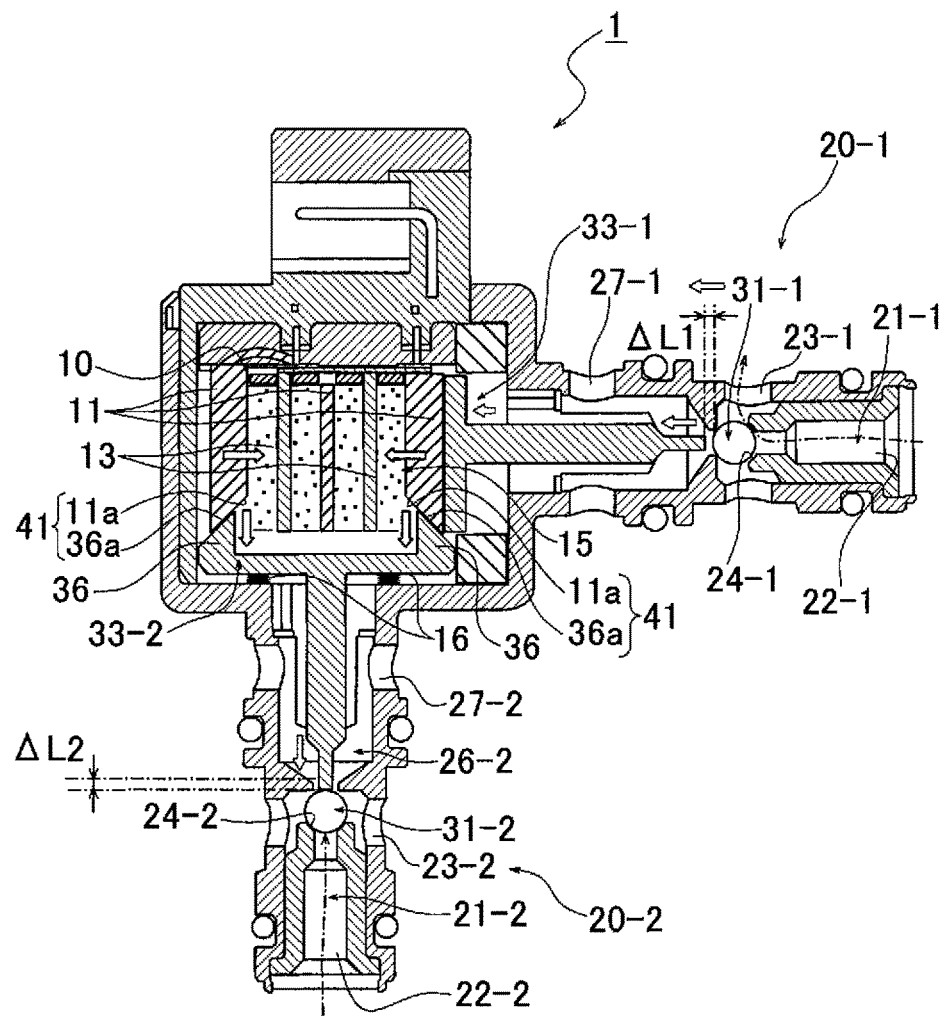

FIGS. 2A and 2B are diagrams illustrating operations of the PVC gel actuator 10 and the valve device 1. FIG. 2A is a diagram illustrating a state when not applying voltage to the PVC gel actuator 10. FIG. 2B is a diagram illustrating a state when applying voltage to the PVC gel actuator 10.

In the contraction-type PVC gel actuator 10 having the above structure, when applying a pre-determined voltage between the negative plates 11 and the positive plates 13 in the state shown in FIG. 2A, the PVC gel 15 interleaved between each negative plate 11 and each positive plate 13 moves toward the positive plates 13. At that time, since the positive plate 13 is mesh-like, the PVC gel 15 deforms to slide into mesh-like spaces. As shown in FIG. 2B, this causes the height of the laminating direction of the contraction-type PVC gel actuator 10 to become smaller (i.e., thinner) than when not applying voltage. In contrast, when stopping voltage application, the PVC gel 15 returns to the original state, and hence the height of the laminating direction of the contraction-type PVC gel actuator 10 is restored to its original height.

Operations of the valve device 1 associated with deformation of expansion and contraction of the PVC gel actuator 10 will be described hereinafter. Here will be described each of operations of the first valve mechanism 20-1 and the second valve mechanism 20-2 in order. First, in the first valve mechanism 20-1, when not applying voltage to the contraction-type PVC gel actuator 10 as shown in FIG. 2A, the ball valve 31-1 is seated on the valve seat 24-1 in the oil passage 21-1 by force of a preset load from the contraction-type PVC gel-actuator 10 to the first plunger 33-1 and the ball valve 31-1. This causes the oil passage 21-1 to remain closed off. In contrast, when applying voltage to the contraction-type gel actuator 10, the height of the laminating direction of the contraction-type gel actuator 10 becomes small. This causes the first plunger 33-1 to move to the contraction-type PVC gel actuator 10 side (amount of movement: ΔL1) so as to release the preset load from the contraction-type PVC gel-actuator 10 to the ball valve 31-1. Then, hydraulic pressure of the hydraulic fluid in the inlet port 22-1 separates the ball valve 31-1 from the valve seat 24-1, which opens the oil passage 21-1.

In contrast, when stopping voltage application to the contraction-type PVC gel actuator 10 in this state, the contraction-type PVC gel actuator 10 is restored to its original form, resulting that the ball valve 31-1 is seated on the valve seat 24-1 to close off the oil passage 21-1 as shown in FIG. 2A.

Meanwhile, in the second valve mechanism 20-2, when not applying voltage to the PVC gel actuator 10, the negative plates 11 and the positive plates 13 are separated from each other to the both sides in the housing 56 as shown in FIG. 2A so that the inclined planes 11*a*, 11*a* of the negative plates 11 do not push down the inclined planes 36*a*, 36*a* of the second plunger 33-2 and the said second plunger 33-2 is evacuated to an upward position. In this state, the ball valve 31-2 is biased to the direction to be separated from the valve seat 24-2 by hydraulic pressure of the hydraulic fluid in the inlet port 22-2, which opens the oil passage 21-2.

When applying a predetermined voltage between the negative plates 11 and the positive plates 13 of the PVC gel actuator 10 in the state as shown in FIG. 2A, the distance between the negative plates 11, 11 on the both sides becomes narrow. Then, the pressing force acts from the inclined planes 11*a*, 11*a* of the negative plates 11, 11 to the inclined planes 36*a*, 36*a* of the second plunger 33-2. Thus, the second plunger 33-2 moves to the ball valve 31-2 side (i.e., the downside) by the pressing force against the biased force of the coil spring 16. By force of the load from the negative plates 11, 11 of the PVC gel actuator 10 to the second plunger 33-2, the second plunger 33-2 moves downward (amount of movement: ΔL2) and the ball valve 31-2 pushed by the second plunger 33-2 is seated on the valve seat 24-2 of the oil passage 21-2, which closes the oil passage 21-2.

In contrast, when stopping voltage application to the PVC gel actuator 10, the distance between the negative plates 11, 11 extends to their original positions. This causes the second plunger 33-2 which was pushed down by the negative plates 11, 11 to rise by the biased force of the coil spring 16 and the hydraulic pressure of the hydraulic fluid in the inlet port 22-2 that is exerted on the ball valve 31-2, and then the ball valve 31-2 separates from the valve seat 24-2 so as to open the oil passage 21-2.

Thus, in the valve device 1 of the embodiment, the PVC gel actuator 10 deforms in response to application/non-application of voltage so that opening and closing of the oil passage 21-1 of the first valve mechanism 20-1 and opening and closing of the oil passage 21-2 of the second valve mechanism 20-2 are performed simultaneously. The first valve mechanism 20-1 is a normally-closed type valve mechanism where the oil passage 21-1 is closed when not applying voltage and the oil passage 21-1 is opened by evacuating the ball valve 31-1 when applying voltage. The second valve mechanism 20-2 is so-called a normally-open type valve mechanism which is configured to open the oil passage 21-2 when not applying voltage and close the oil passage 21-2 when applying voltage.

Therefore, when not applying voltage to the valve device 1, the oil passage 21-1 of the first valve mechanism 20-1 is closed and the oil passage 21-2 of the second valve mechanism 20-2 is opened. In contrast, when applying voltage to the valve device 1, the oil passage 21-1 of the first valve mechanism 20-1 is opened and the oil passage 21-2 of the second mechanism 20-2 is closed.

As described above, the valve device 1 of the embodiment is configured in a way that deformation of expansion and contraction by controlling voltage applied to the PVC gel actuator 10 allows for simultaneous driving of the ball valve 31-1 intervened by the first plunger 33-1 and the ball valve 31-2 intervened by the second plunger 33-2, which can simultaneously switch opening and closing of the oil passages 21-1, 21-2.

This allows to open and close both the oil passages 21-1, 21-2 at an identical timing so as to improve accuracy of hydraulic control in a hydraulic circuit that open and close the plural oil passages.

Further, the PVC gel actuator 10 is relatively simple in structure, small in size and lightweight compared to solenoid. Therefore, the valve device 1 of the embodiment comprises the PVC gel actuator 10 as an actuator to drive the ball valve 31, thereby achieving a quite simple structure and being capable of major reduction in size, weight and cost compared to a valve device comprising an actuator consisting of conventional solenoid. Specifically, since an automatic transmission installed in a vehicle uses plural valve devices for hydraulic control, using the valve device 1 of the embodiment for the said valve devices can largely contribute to reduction in size, weight and cost of the automatic transmission and the vehicle. Further, in the valve device 1 of the embodiment, deformation of expansion and contraction of the PVC gel actuator 10 drives the ball valve 31 so that operating noise at time of opening and closing the oil passage 21 cannot occur or can be greatly minimized, which ensures good quality of the valve device 1 with tranquility during operation.

Figure 3:
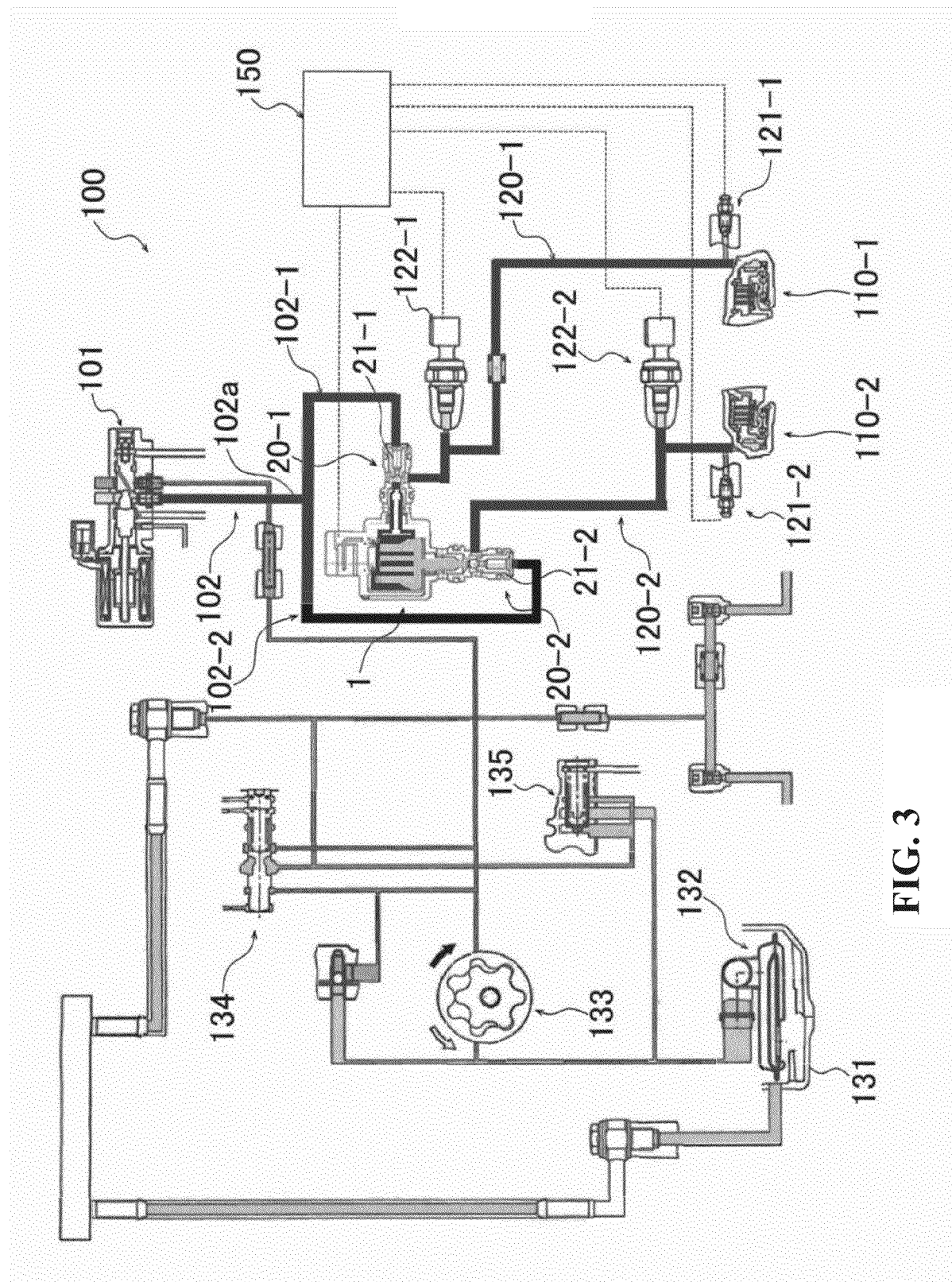
FIG. 3 is a diagram illustrating by way of example a configuration of an hydraulic circuit using a valve device.

Next, flow control of the hydraulic fluid in a hydraulic circuit provided with the valve device 1 will be described. FIG. 3 is a diagram illustrating a hydraulic circuit 100 provided with the valve device 1. The hydraulic circuit 100 as shown in the figure is apart of a hydraulic circuit for gearshift control provided by an automatic transmission for a vehicle. In this hydraulic circuit 100, an oil passage 102 downstream of a linear solenoid valve 101 branches at a branch connection 102a to a first oil passage 102-1 communicating to a first clutch 110-1 and to a second oil passage 102-2 communicating to a second clutch 110-2. The first oil passage 102-1 passes through the oil passage 21-1 of the first valve mechanism 20-1, and the second oil passage 102-2 passes through the oil passage 21-2 of the second valve mechanism 20-2. This enables to control supply of hydraulic fluid to the first clutch 110-1 via the first oil passage 102-1 by controlling opening and closing of the first oil passage 21-1 with the first valve mechanism 20-1, and to control supply of hydraulic fluid to the second clutch 110-2 via the second oil passage 102-2 by controlling opening and closing of the second oil passage 21-2 with the second valve mechanism 20-2. Hereinafter, a circuit leading to the first clutch 110-1 including the first oil passage 102-1 will be referred to as a first hydraulic circuit 120-1, and a circuit leading to the second clutch 110-2 including the second oil passage 102-2 will be referred to as a second hydraulic circuit 120-2.

The first hydraulic circuit 120-1 is provided with a first oil temperature sensor 121-1 for detecting temperature of hydraulic fluid passing through the first oil passage 102-1 and a first oil pressure sensor (i.e., a first pressure detection section) 122-1 for detecting pressure of hydraulic fluid passing through the first oil passage 102-1. The second hydraulic circuit 120-2 is provided with a second oil temperature sensor 121-2 for detecting temperature of hydraulic fluid passing through the second oil passage 102-2 and a second oil pressure sensor (i.e., a second pressure detection section) 122-2 for detecting pressure of hydraulic fluid passing through the second oil passage 102-2.

The temperatures of hydraulic fluid detected by the first and second oil temperature sensors 121-1, 121-2 and the pressures of hydraulic fluid detected by the first and second oil pressure sensors 122-1, 122-2 are outputted to a controller (i.e., a failure detection section) 150. The controller 150 can control voltage applied to the PVC gel actuator 10 of the valve device 1 on a basis of temperatures value detected by the first and second oil temperature sensors 121-1, 121-2 and/or temperature values detected by the first and second oil pressure sensors 122-1, 122-2.

In the hydraulic circuit 100 having the above structure, the hydraulic fluid pumped from a reservoir tank 131 via an oil strainer 132 by an oil pump (i.e., a hydraulic pump) 133 is pressure-regulated to line pressure by means of a regulator valve 134. An accumulator 135 is connected to the regulator valve 134 for compensation when the line pressure is lowered. The hydraulic fluid at line pressure after pressure-regulated by the linear solenoid valve 101 is supplied to the first and second clutches 110-1, 110-2 of transmission mechanism via the valve device (i.e., the shift valve) 1. In other words, the hydraulic fluid from the linear solenoid valve 101 is supplied to the first and second clutches 110-1, 110-2 via the first and second valve mechanisms 20-1, 20-2 of the valve device 1. Drive control of the first and second valve mechanisms 20-1, 20-2 provided by the valve device 1 switches opening and closing of the first and second oil passages 102-1, 102-2, thereby controlling supply of the hydraulic fluid to the first and second clutches 110-1, 110-2.

Specifically, when not applying voltage to the valve device 1, the oil passage 21-1 of the first valve mechanism 20-1 is closed and the oil passage 21-2 of the second valve mechanism 20-2 is opened. Therefore, the hydraulic fluid from the linear solenoid valve 101 is supplied only to the second clutch 110-2 through the second hydraulic circuit 120-2, thereby operating (i.e., fastening) the second clutch 110-2. Meanwhile, when applying voltage to the valve device 1, the oil passage 21-1 of the first valve mechanism 20-1 is opened and the oil passage 21-2 of the second valve mechanism 20-2 is closed. Therefore, the hydraulic fluid from the linear solenoid valve 101 is supplied only to the first clutch 110-1 through the first hydraulic circuit 120-1, thereby operating (i.e., fastening) the first clutch 110-1. In this way, since switching application/non-application of voltage to the valve device 1 enables to open and close both the oil passage 21-1 with the first valve mechanism 20-1 and the oil passage 21-2 with the second valve mechanism 20-2 simultaneously, the operation (i.e., the fastening) of the first and second clutches 110-1, 110-2 can be switched without time lag.

Figure 4:
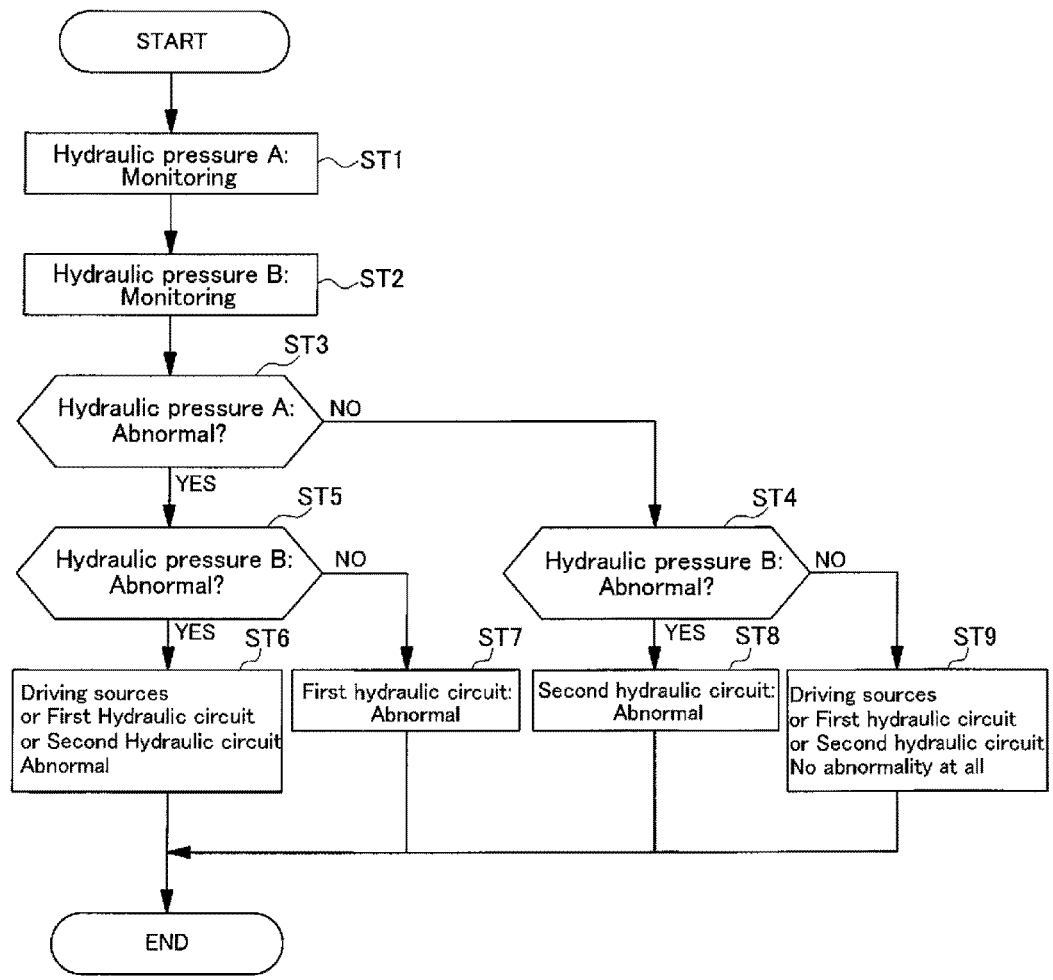
FIG. 4 is a flowchart illustrating procedures to detect failures of a valve device.
Figure 5A:
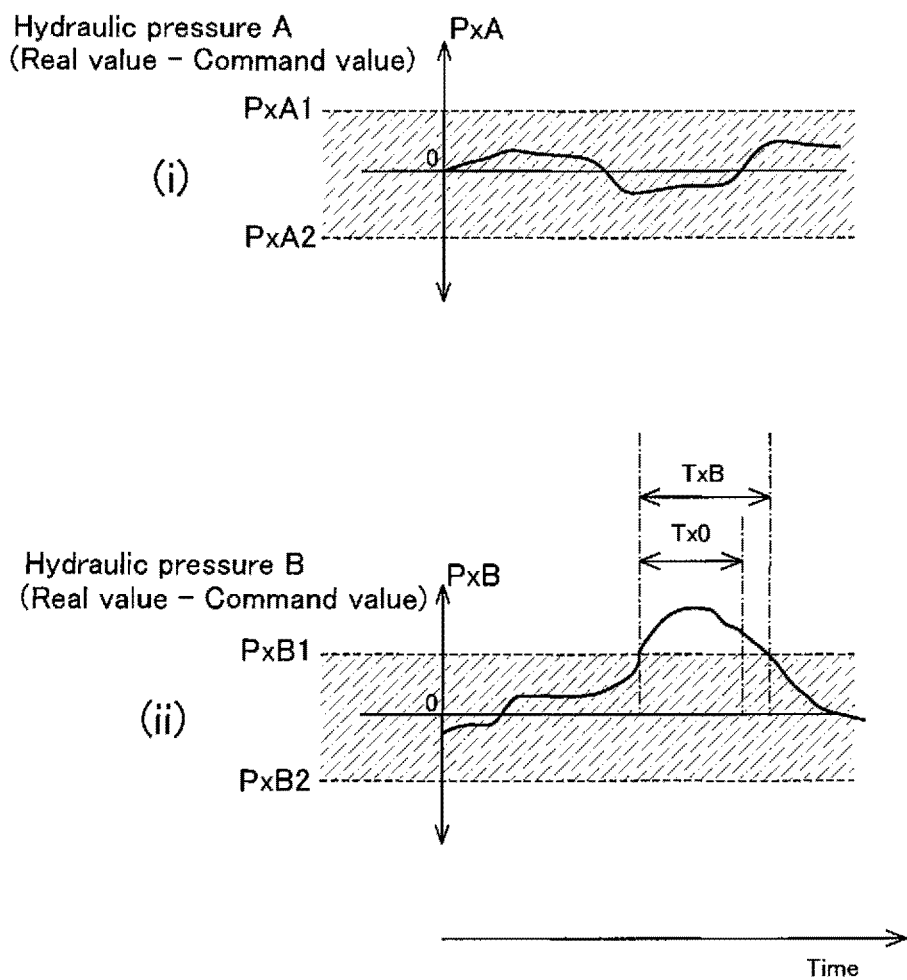
FIG. 5A and FIG. 5B are graphs illustrating timing charts of hydraulic pressure used for failure detection of a valve device.
Figure 5B:
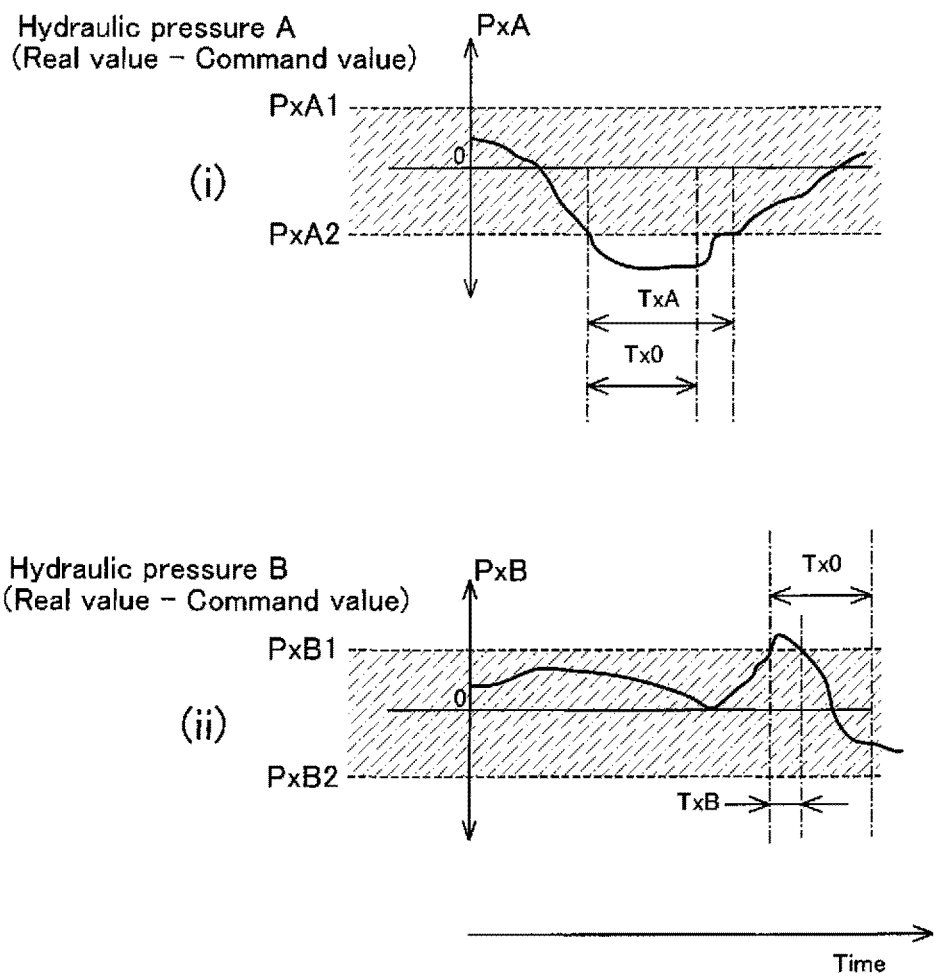

Next, failure detection of the valve device 1 and the first and second hydraulic circuits 120-1, 120-2 in the hydraulic circuit 100 will be described. FIG. 4 is a flowchart showing procedures for failure detection of the valve device 1 and the first and second hydraulic circuits 120-1, 120-2. FIGS. 5A and 5B are graphs showing timing charts of hydraulic pressure used for failure detection of the valve device 1 and the first and second hydraulic circuits 120-1, 120-2. As shown in the flowchart shown in FIG. 4, the first step (ST1) monitors a difference between a hydraulic pressure value (i.e., a real value) of the first hydraulic circuit 120-1 detected by the first hydraulic sensor 122-1 and a hydraulic pressure command value to the first hydraulic circuit 120-1 (hereinafter, this difference value will be referred to as "hydraulic pressure A"). The second step (ST2) monitors a difference between a hydraulic pressure value (i.e., a real value) of the second hydraulic circuit 120-2 detected by the second hydraulic sensor 122-2 and a hydraulic pressure command value to the second hydraulic circuit 120-2 (hereinafter, this difference value will be referred to as "hydraulic pressure B"). The third step (ST3) determines whether the hydraulic pressure A is abnormal or not. Determination of abnormality in the hydraulic pressure A is performed, as shown in the graphs of FIGS. 5A($i$) and 5B($i$), in such a way as to calculate a hydraulic pressure A value PxA sequentially, thereby monitoring whether the value PxA is between an upper threshold PxA1 and a lower threshold PxA2 (i.e., PxA1≥PxA≥PxA2). Then, as FIG. 5B($i$) shows, when the hydraulic pressure A value PxA is out of the range of the upper threshold PxA1 to the lower threshold PxA2, and its duration TxA is beyond a predetermined duration Tx0, the abnormality of the hydraulic pressure A is confirmed.

In the same manner, the fourth step (ST4) determines whether the hydraulic pressure B is abnormal or not. Determination of abnormality in the hydraulic pressure B is performed, as shown in the graphs of FIGS. 5A($ii$) and 5B($ii$), in such a way as to calculate a hydraulic pressure B value PxB sequentially, thereby monitoring whether the value PxB is between an upper threshold PxB1 and a lower threshold PxB2 (i.e., PxB1≥PxB≥PxB2). Then, as FIG. 5A($ii$) shows, when the hydraulic pressure value PxB is out of the range of the upper threshold PxB1 to the lower threshold PxB2, and its duration TxB is beyond a predetermined duration Tx0, the abnormality of the hydraulic pressure B is confirmed.

As a result, when a hydraulic pressure A is abnormal (YES in ST3) and a hydraulic pressure B is abnormal (YES in ST5), the sixth step (ST6) determines that at least one of driving sources of the valve device 1 (including the PVC gel actuator 10, its power supply system and so on, which will apply hereinafter), the first hydraulic circuit 120-1 and the second hydraulic circuit 120-2 has an abnormality such as failure. When a hydraulic pressure A is abnormal (YES in ST3) and a hydraulic pressure B is not abnormal (NO in ST5), the seventh step (ST7) determines that the driving sources of the valve device 1 and the second hydraulic circuit 120-2 are normal but the first hydraulic circuit 120-1 has an abnormality such as failure. When a hydraulic pressure A is not abnormal (NO in ST3) and a hydraulic pressure B is abnormal (YES in ST4), the eighth step (ST8) determines that the driving sources of the valve device 1 and the first hydraulic circuit 120-1 are normal but the second hydraulic circuit 120-2 has an abnormality such as failure. When both a hydraulic pressure A and a hydraulic pressure B are not abnormal (NO both in ST3 and ST4), the ninth step (ST9) determines that the driving sources of the valve device 1 is not abnormal, the first hydraulic circuit 120-1 and the second hydraulic circuit 120-2 are not abnormal, and all of them are normal.

Here, failure determination based upon hydraulic pressures A, B of the first and second hydraulic circuits 120-1, 120-2 will be described by way of example. First, a case 1 where values of hydraulic pressures A and B fall as shown in the graphs of FIGS. 5A ($i$) and ($ii$) respectively will be described. Here, the hydraulic pressure A value PxA is in the range between the upper threshold PxA1 and the lower threshold PxA2. Meanwhile, the hydraulic pressure B value PxB is out of the range between the upper threshold PxB1 and the lower threshold PxB2, and its duration TxB is beyond the predetermined duration Tx0. In this case 1, ST8 determines that the second hydraulic circuit 120-2 has a failure. Patterns determined to be not abnormal in a hydraulic pressure A include the case shown in the graph of FIG. 5A($i$) as well as the case where a hydraulic pressure A value PxA is temporally beyond a range between an upper threshold PxA1 and a lower threshold PxA2, yet its duration TxA is within a predetermined Tx0, the illustration of which is dispensed with.

Next, a case 2 where values of hydraulic pressures A and B fall as shown in the graphs of FIGS. 5B ($i$) and ($ii$) respectively will be described. Here, the hydraulic pressure A value PxA is out of the range between the upper threshold PxA1 and the lower threshold PxA2 and its duration TxA is beyond the predetermined duration Tx0. Meanwhile, the hydraulic pressure B value PxB is temporally out of the range between the upper threshold PxB1 and the lower threshold PxB2, yet its duration TxB is within the predetermined duration Tx0. In this case 2, ST7 determines that the first hydraulic circuit 120-1 has a failure. Patterns determined to be not abnormal in a hydraulic pressure B include the case shown in the graph of FIG. 5B ($ii$) as well as the case where a hydraulic pressure B value PxB is not beyond a range between an upper threshold PxB1 and a lower threshold PxB2, the illustration of which is dispensed with.

As described above, in determining which of the driving sources of the valve device 1 or the first and second hydraulic circuits 120-1, 120-2 have a failure, when a hydraulic pressure value A of the first hydraulic circuit 120-1 is normal (i.e., falls on a command value) and a hydraulic pressure value B of the second hydraulic circuit 120-2 is not abnormal (i.e., does not fall on a command value), it can be determined by the normal hydraulic pressure value A of the first hydraulic circuit 120-1 that the driving sources of the valve device 1 is normal. In addition, it can be quickly determined on a basis of the hydraulic pressure values A, B that the first hydraulic circuit 120-1 is normal and the second hydraulic circuit 120-2 has a failure.

Thus, the failure detector of the hydraulic circuit 100 of the embodiment determines that the driving sources of the valve device 1 are normal and either of the first or second hydraulic circuit 120-1, 120-2 has a failure in the case where only one of either a value PxA based upon pressure detected by the first hydraulic sensor 122-1 or a value PxB based upon pressure detected by the second hydraulic sensor 122-2 is out of a normal range. This enables, when a failure occurs to the hydraulic circuit 100, to determine which of the driving sources of the valve device 1 or the first and second hydraulic circuits 120-1, 120-2 the failure is attributed to, and which of the first or second hydraulic circuit 120-1, 120-2 has the failure when the failure has occurred to either of the first or second hydraulic circuit 120-1, 120-2. Therefore, the cause of the to the PVC gel actuator 10. The valve device 1-2 of the embodiment, compared to the valve device 1 of the first embodiment, omits a coil spring 16 which biases a second plunger 33-2 upward, and instead provides guide mechanisms 17, 17 between negative plates 11 and the second plunger 33-2 for guiding their relative movements.

Figure 6A:
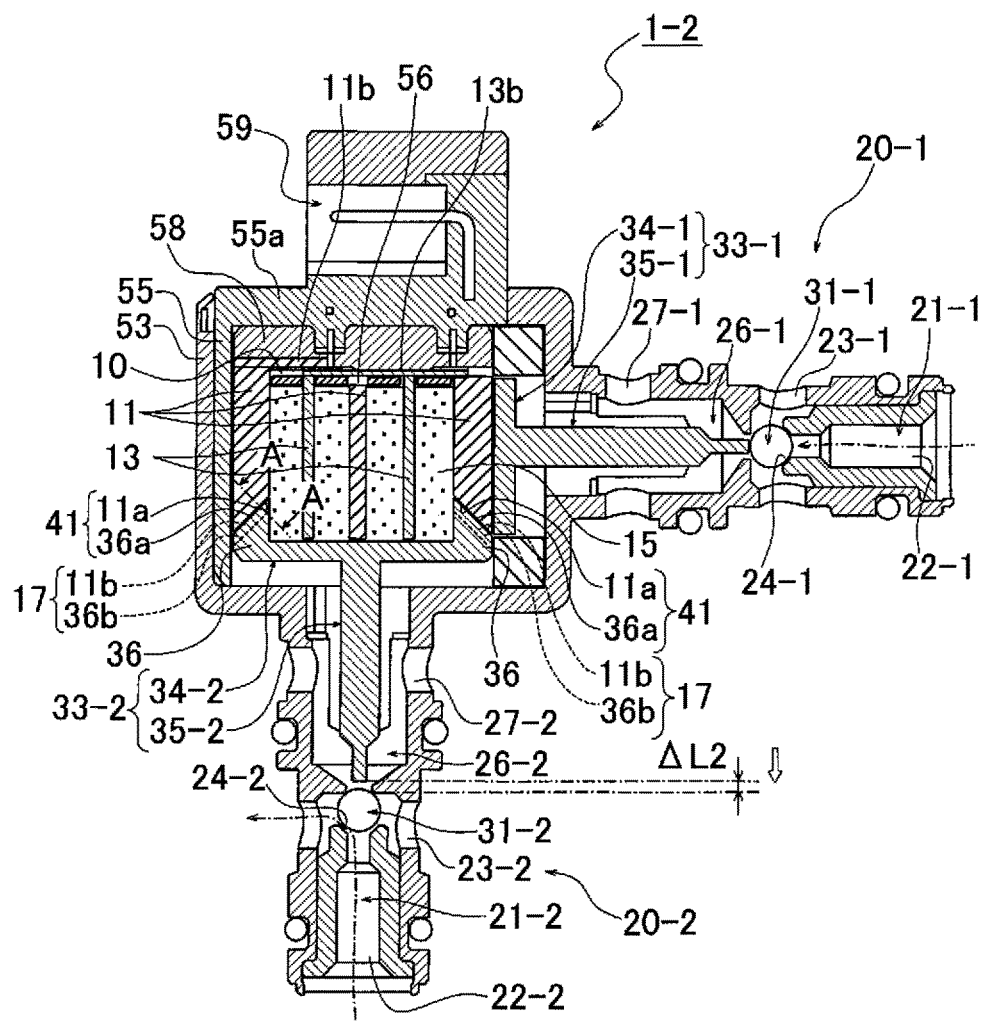
FIG. 6A and FIG. 6B are diagrams illustrating a valve device according to a second embodiment of the present invention.
Figure 6B:
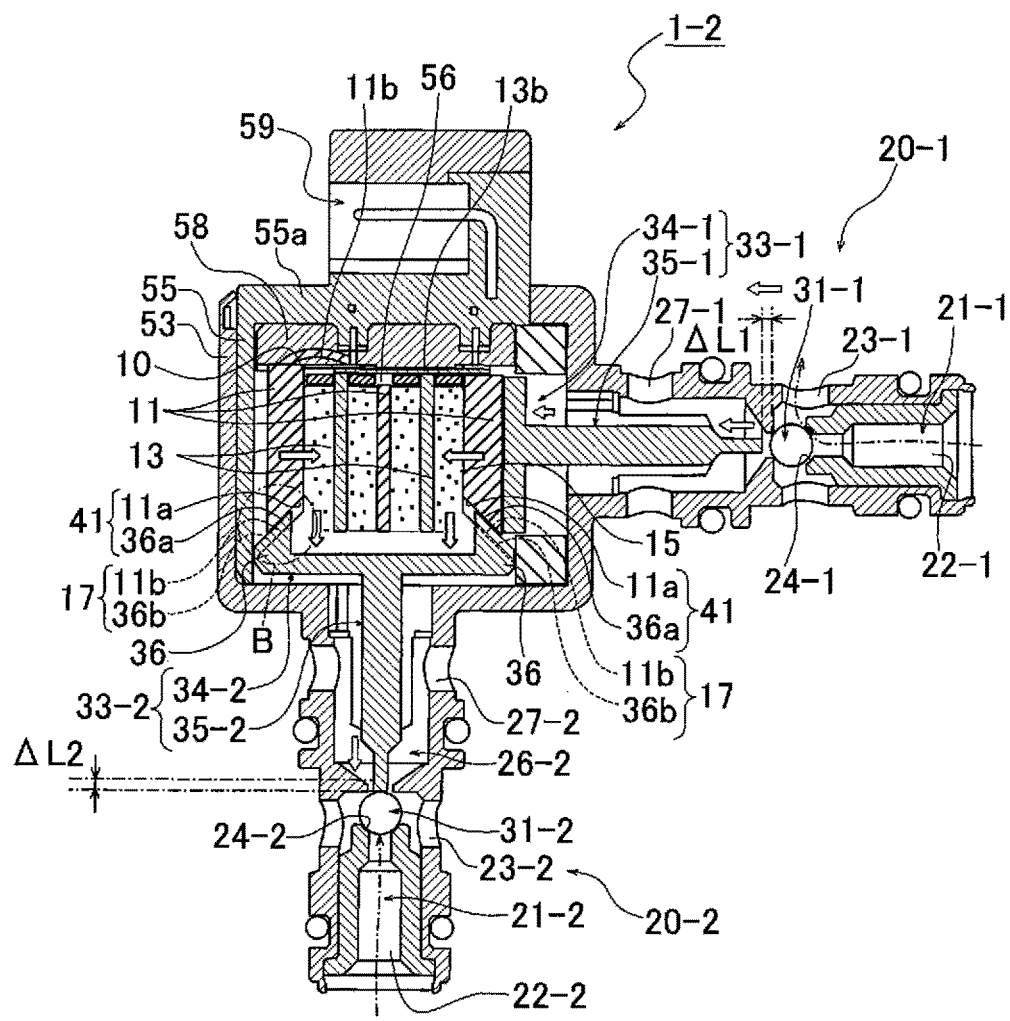
Figure 7A:
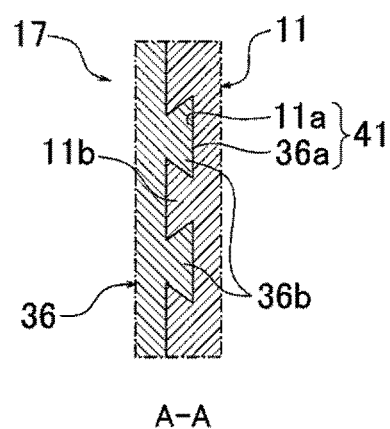
FIG. 7A is an enlarged partial sectional view illustrating an A-A cross-section view of FIG. 6A.
Figure 7B:
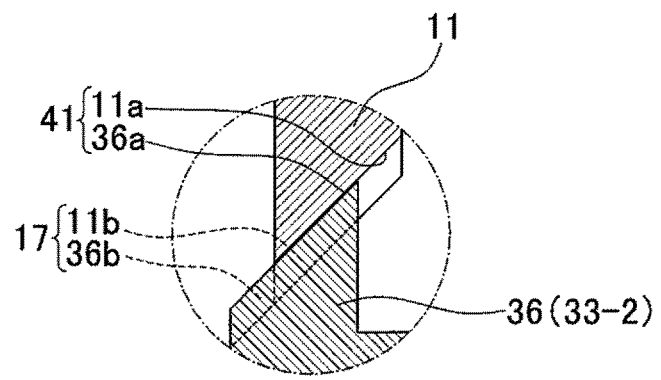
FIG. 7B is an enlarged partial view illustrating part B of FIG. 6B.

FIGS. 7A and 7B are diagrams illustrating detailed configurations of the guide mechanisms 17, 17. FIG. 7A is an enlarged partial sectional view illustrating an A-A cross-section view of FIG. 6A, and FIG. 7B is an enlarged partial view illustrating a part B of FIG. 6B. Both the guide mechanisms 17, 17 are symmetrical to each other and in an identical form. As shown in FIGS. 6A and 6B, and FIGS. 7A and 7B, the guide mechanism 17 installed between the negative plate 11 and the second plunger 33-2 is configured to engage a projection 11b formed along an inclined plane 11a of the negative plate 11 and a projection 36b formed along an inclined plane 36a of a protruding part 36 of the plunger 33-2 with each other. Each of the projections 11b, 36b extends along the direction that the inclined planes 11a, 36a are in sliding contact with each other by means of relative movement between the negative plate 11 and the plunger 33-2. Protruding parts whose cross section is roughly wedge-shaped are formed on both the longitudinal failure can be identified quickly and accurately, and an appropriate fail safe action can be taken.

Further, the failure detector of the embodiment can identify the cause of failure in the hydraulic circuit 100 by using values based upon pressures detected by the first and second hydraulic sensors 122-1, 122-2, which can streamline control specifications of the failure detector and contribute to reduction in cost of the device.

Second Embodiment

Next, a second embodiment of the present invention will be described. In the description of the second embodiment and the corresponding figures, like reference characters refer to components corresponding or equivalent to those of the first embodiment and a detailed description thereof is dispensed with. The other features than those described as below are the same as in the first embodiment. The same holds for the other embodiments of the invention.

FIGS. 6A and 6B are diagrams illustrating a valve device 1-2 of the second embodiment. FIG. 6A is a diagram illustrating a state when not applying voltage to a PVC gel actuator 10, and FIG. 6B is a diagram illustrating a state when applying voltage sides of the inclined planes 11b, 36b. The guide mechanism 17 installs the negative plate 11 and the plunger 33-2 to be inseparable with each other by engaging the roughly wedge-shaped protruding part of the projection 11b and the wedge-shaped protruding part of the projection 36b adjacent thereto being meshed with each other, and is configured to guide the inclined plane 11a and the inclined plane 36a to relatively move to the direction of their sliding contact.

In the valve device 1-2 of the embodiment, as well as the valve device 1 of the first embodiment, the distance between the negative plates 11, 11 on the both sides becomes closer by applying voltage to the PVC gel actuator 10. Thus, as shown in FIG. 6B, the negative plates 11, 11 push down a base 34-2 of the second plunger 33-2 so that the leading end of a needle part 35-2 abuts on and presses a ball valve 31-2. At this time, the inclined plane 36a of the second plunger 33-2 relatively moves (i.e., slides) maintaining surface-contact with the inclined plane 11a of the negative plate 11 by means of the guide mechanism 17. This causes the second plunger 33-2 to move downward with its inclined planes 36a, 36a being in surface-contact with the inclined planes 11a, 11a of the negative plates 11, 11.

In contrast, when stopping voltage application to the PVC gel actuator 10, the distance between the negative plates 11, 11 extends to their original positions. At this time, the inclined plane 11a of the negative plate 11 and the inclined plane 36a of the second plunger 33-2 slide by means of the guide mechanism 17, maintaining surface-contact with each other, so that the second plunger 33-2 is pulled upward as the negative plates 11, 11 are separated from each other. This causes the ball valve 31-2 to rise by hydraulic pressure of hydraulic fluid in an inlet port 22 and be separated from a valve seat 24-2, which opens an oil passage 21-2.

The valve device 1-2 and the PVC gel actuator 10 of the embodiment are provided with the guide mechanisms 17, 17, but not with a coil spring 16, which enables to restore the second plunger 33-2 of the second valve mechanism 20-2 to its original position when stopping voltage application to the PVC gel actuator 10 by causing the second plunger 33-2 to follow the negative plates 11, 11 returning to their original positions on the both sides. Therefore, the valve device 1-2 can be reduced in the number of components, weight and cost by omitting the coil spring 16.

Although the embodiments of the present invention have been explained above, the present invention is not limited to the above embodiments. Various modifications can be made in a scope of the technical idea described in the following claims, the specification described above and the accompanying drawings without departing from the spirit and scope of the present invention. For instance, while the above embodiments have described the case where the negative plates 11 are arranged on the both outsides of the laminating direction of the PVC gel actuator 10, a negative plate and a positive plate can be arranged respectively at one end and the other end of the laminating direction of a high polymer gel actuator used for the valve device 1 according to the present invention. It is noted that, in this case, the power transmission section composed of inclined planes according to the present invention should be installed between each of the negative and positive plates on the both sides of the PVC gel actuator and a second actuating member (i.e., a second plunger).

Further, the configuration of the power transmission section described in the above embodiments is suggested by way of example only and hence, other configurations of the power transmission section according to the present invention than abutment of the inclined planes 11a, 36a on each other described in the above embodiments may be adopted, provided they can transmit driving force of a high polymer gel actuator to a second actuating member of a second valve mechanism.

What is claimed is:

1. A valve device comprising:
a contraction-type high polymer gel actuator which laminates one or more slab-like negative plates and one or more mesh-like positive plates alternately and interleaves high polymer gel between each negative plate and each positive plate;
a first valve mechanism consisting of a first fluid passage in which fluid flows, a first valve plug for opening and closing the first fluid passage and a first actuating member for transmitting driving force associated with deformation of expansion and contraction of the high polymer gel actuator between the high polymer gel actuator and the first valve plug;
and a second valve mechanism consisting of a second fluid passage in which fluid flows, a second valve plug for opening and closing the second fluid passage, and a second actuating member for transmitting driving force associated with deformation of expansion and contraction of the high polymer gel actuator between the high polymer gel actuator and the second valve plug;
wherein the direction of movement of the negative plates and the positive plates associated with deformation of expansion and contraction of the high polymer gel actuator is the same as the driving direction of the first actuating member and the first valve plug of the first valve mechanism, and is perpendicular to the driving direction of the second actuating member and the second valve plug of the second valve mechanism; and opening and closing of the first fluid passage and opening and closing of the second fluid passage are configured to be simultaneously switched by simultaneously driving the first valve plug intervened by the first actuating member and the second valve plug intervened by the second actuating member by means of deformation of expansion and contraction by controlling voltage applied to the high polymer gel actuator.

2. The valve device as claimed in claim 1;
wherein while the first actuating member of the first valve mechanism is configured to be loaded from the negative plates or the positive plates of the high polymer gel actuator into the laminating direction so as to move to the same direction, a power transmission section for converting forward and backward movement of the negative plates or the positive plates into forward and backward movement of the second actuating member to be transmitted is installed between the second actuating member of the second valve mechanism and the negative plates or the positive plates of the high polymer gel actuator, and the second actuating member is configured to move to the second valve plug side via the power transmission section when the negative plates and the positive plates move closer to each other by applying voltage to the high polymer gel actuator.

3. The valve device as claimed in claim 2;
wherein the power transmission section comprises:
first inclined planes mounted on the negative plates or the positive plates which are inclined to the direction of their forward and backward movement and second inclined planes mounted on the second actuating member which are inclined to the direction of its forward and backward movement; the first inclined planes and the second inclined planes abut on each other in surface-contact; and
the second actuating member is configured to move to the second valve plug side by pressing the second inclined planes with the first inclined planes when the negative plates and the positive plates move closer to each other by applying voltage to the high polymer gel actuator.

4. The valve device as claimed in claim 2; comprising a biasing member for biasing toward the direction that the second actuating member is separated from the second valve plug.

5. The valve device as claimed in claim 3; comprising a biasing member for biasing toward the direction that the second actuating member is separated from the second valve plug.

6. The valve device as claimed in claim 2;
wherein guide mechanisms for moving the second actuating member forward and backward while maintaining contact between the second inclined planes and the first inclined planes are installed between the negative or positive plates and the second actuating member; and
the guide mechanisms are configured to engage projections installed on the negative or positive plate side with other projections installed on the second actuating member in such a way as to be relatively-movable only to the sliding direction of the first inclined planes and the second inclined planes.

7. The valve device as claimed in claim 3;
wherein guide mechanisms for moving the second actuating member forward and backward while maintaining contact between the second inclined planes and the first inclined planes are installed between the negative or positive plates and the second actuating member; and
the guide mechanisms are configured to engage projections installed on the negative or positive plate side with other projections installed on the second actuating member in such a way as to be relatively-movable only to the sliding direction of the first inclined planes and the second inclined planes.

8. A failure detector of a hydraulic circuit comprising:
the valve device as claimed in claim 1;
a first hydraulic circuit for switching opening and closing an oil passage by the first valve mechanism of the valve device;
a second hydraulic circuit for switching opening and closing of an oil passage by the second valve mechanism of the valve device;
a first pressure detection section for detecting pressure of hydraulic fluid of a first hydraulic circuit;
a second pressure detection section for detecting pressure of hydraulic fluid of a second hydraulic circuit; and
a failure detection section for detecting failures of driving sources including the high polymer gel actuator of the valve device and failures of the first and second hydraulic circuits on a basis of pressure detected by the first and second pressure detection sections;
wherein the failure detection section determines that the driving source of the valve device are normal and either of the first or second hydraulic circuit has a failure in the case where only one of either a value based upon pressure detected by the first pressure detection section or a value based on pressure detected by the second pressure detection section falls out of a normal range.

9. The failure detector of the hydraulic circuit as claimed in claim 8;
wherein the failure detection section determines that values based upon pressure detected by the first or second pressure detection section have fallen out of a normal range in the case where differences between the detected values of pressure detected by the first and second pressure detection sections and a predetermined pressure command exceed a predetermined range and their durations last longer than a predetermined duration.

* * * * *